(12) United States Patent
Gupta et al.

(10) Patent No.: US 11,061,838 B1
(45) Date of Patent: Jul. 13, 2021

(54) SYSTEM AND METHOD FOR GRAPHICS PROCESSING UNIT MANAGEMENT INFRASTRUCTURE FOR REAL TIME DATA COLLECTION

(71) Applicant: DELL PRODUCTS, LP, Round Rock, TX (US)

(72) Inventors: Chitrak Gupta, Bangalore (IN); Rama Bisa, Bangalore (IN); Rajeshkumar Patel, Bangalore (IN); Chandrasekhar Puthilathe, Bangalore (IN); John R. Palmer, Georgetown, TX (US); Akkiah Maddukuri, Austin, TX (US); Pavan Gavvala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/738,446

(22) Filed: Jan. 9, 2020

(51) Int. Cl.
*G06F 13/20* (2006.01)
*G06F 13/42* (2006.01)
*G06T 1/20* (2006.01)
*G06F 13/40* (2006.01)

(52) U.S. Cl.
CPC .......... *G06F 13/20* (2013.01); *G06F 13/4022* (2013.01); *G06F 13/4282* (2013.01); *G06T 1/20* (2013.01); *G06F 2213/0026* (2013.01)

(58) Field of Classification Search
CPC .. G06F 13/20; G06F 13/4022; G06F 13/4282; G06F 2213/0026; G06T 1/20
See application file for complete search history.

(56) References Cited

U.S. PATENT DOCUMENTS

| | | | |
|---|---|---|---|
| 8,132,015 B1 | 3/2012 | Wyatt | |
| 9,934,022 B2 | 4/2018 | Marr et al. | |
| 2017/0262953 A1* | 9/2017 | Ragupathi | G06F 9/5083 |
| 2017/0322900 A1* | 11/2017 | Ma | G06F 13/4068 |
| 2018/0074717 A1* | 3/2018 | Olarig | G06F 11/0757 |
| 2020/0097056 A1* | 3/2020 | Wang | G05B 19/406 |
| 2020/0327036 A1* | 10/2020 | Zhao | G06F 11/3065 |

* cited by examiner

*Primary Examiner* — Nimesh G Patel
(74) *Attorney, Agent, or Firm* — Larson Newman, LLP (57) ABSTRACT

An information handling system includes a first graphics processing unit (GPU) with a first high-speed interface, a second GPU with a second high-speed interface coupled to the first high-speed interface, and a baseboard management controller (BMC). The first GPU is configured to receive a command to provide management data to the BMC, and to provide first management data associated with the first GPU to the first GPU via the first high-speed interface in response to receiving the command. The second GPU is configured to receive the command, to receive the first management data via the second high-speed interface in response to receiving the command, and to provide the first management data and second management data associated with the second GPU to the BMC in further response to the command.

20 Claims, 7 Drawing Sheets

SYSTEM AND METHOD FOR GRAPHICS PROCESSING UNIT MANAGEMENT INFRASTRUCTURE FOR REAL TIME DATA COLLECTION

FIELD OF THE DISCLOSURE

This disclosure generally relates to information handling systems, and more particularly relates to graphics processing unit (GPU) management infrastructure for real time data collection in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first graphics processing unit (GPU) with a first high-speed interface, a second GPU with a second high-speed interface coupled to the first high-speed interface, and a baseboard management controller (BMC). The first GPU may be configured to receive a command to provide management data to the BMC, and to provide first management data associated with the first GPU to the first GPU via the first high-speed interface in response to receiving the command. The second GPU may be configured to receive the command, to receive the first management data via the second high-speed interface in response to receiving the command, and to provide the first management data and second management data associated with the second GPU to the BMC in further response to the command.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
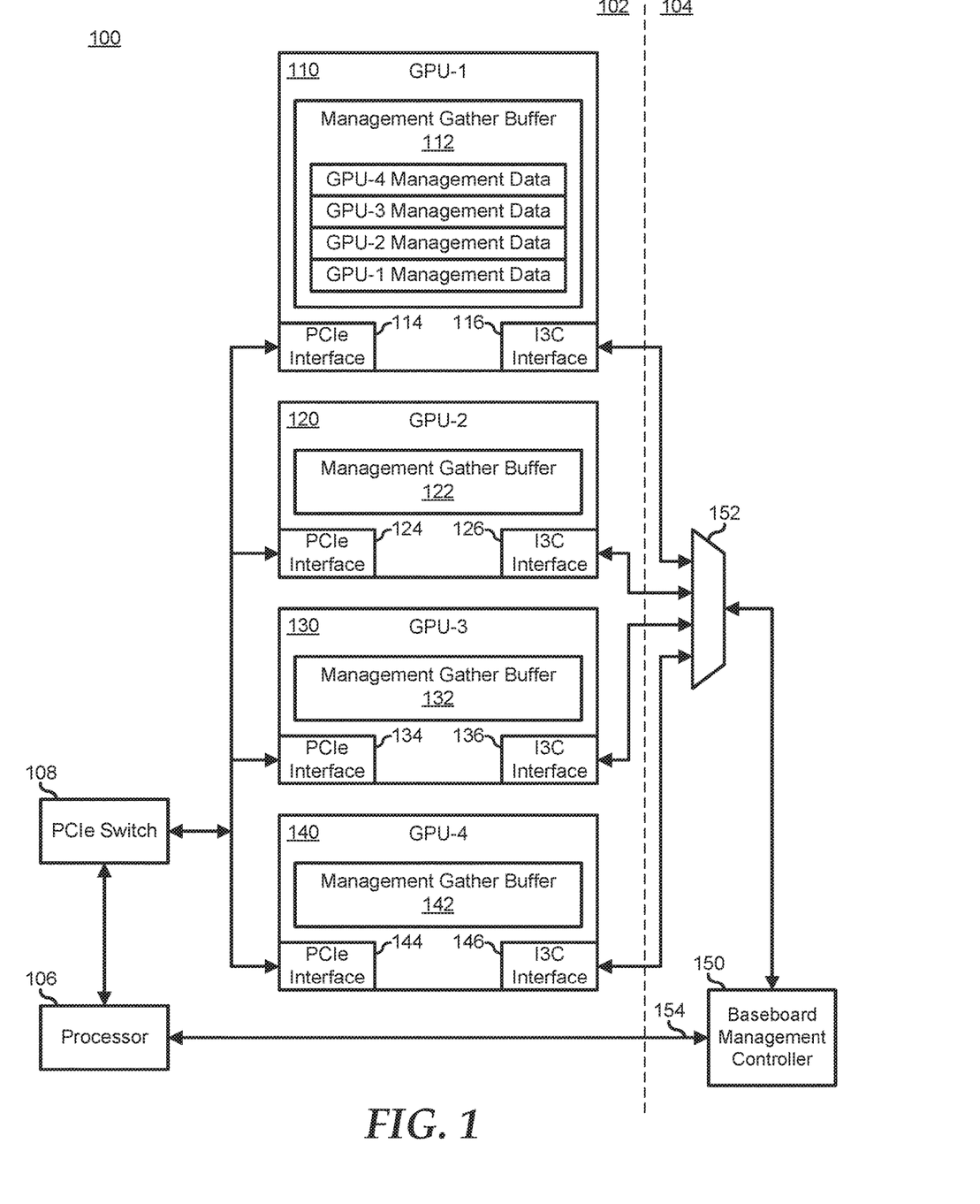
FIG. 1 is a block diagram illustrating an information handling system according to an embodiment of the present disclosure.

FIG. 1 illustrates an information handling system 100, including a host processing system 102 and a management system 104. Host processing system 102 represents hardware, firmware, and software components that are typically associated with a computer or other information handing system, and includes a processor 106, a Peripheral Component Interconnect-Express (PCIe) switch 108, and graphics processing units (GPUs) 110, 120, 130, and 140. Host processor 106 represents one or more central processing units (CPUs), processor cores, or other processing devices. Host processor 106 will be understood to also represent other devices typical of an information handling system such as information handling system 100, and that are utilized to perform the processing tasks of the information handling system, such as initializing and configuring the information handling system under a basic input/output system (BIOS) or a Universal Extensible Firmware Interface (UEFI), loading and executing an operating system (OS), and loading and executing applications programs, software, utilities, and the like. As such, host processor 106 will be understood to include memory devices such as read-only memory (ROM) devices, random access memory (RAM) devices, FLASH memory devices, and the like, data storage devices such as disk drives, solid-state drives (SSDs), and the like, input/output (I/O) devices such as network interface devices, storage interface devices, and the like, human interface devices such as a keyboard, a mouse, a display device, and the like. Host processor 106 is connected to PCIe switch 108, which in turn is connected to GPUs 110, 120, 130, and 140. While PCIe switch 108 is illustrated as being connected by a single point to GPUs 110, 120, 130, and 140, it will be understood that a PCIe interface is a point-to-point interface, and that the PCIe switch is connected to each GPU by a separate PCIe link.

GPUs 110, 120, 130, and 140 represent processing resources of information handling system 100 that can be utilized to offload host processor 106 from various functions as needed or desired. As such, GPUs 110, 120, 130, and 140 may be utilized to accelerate applications running on host processor 106 by offloading compute-intensive and time consuming tasks from the host processor. In particular, GPUs 110, 120, 130, and 140 typically perform parallel processing tasks on data much faster than similar code-based operations performed by host processor 106. GPU 110 includes a management gather buffer 112, a PCIe interface 114 connected to PCIe switch 108, and an I3C interface 116 connected to multiplexor 152. GPU 120 includes a management gather buffer 122, a PCIe interface 124 connected to PCIe switch 108, and an I3C interface 126 connected to multiplexor 152. GPU 130 includes a management gather buffer 132, a PCIe interface 134 connected to PCIe switch 108, and an I3C interface 136 connected to multiplexor 152. GPU 140 includes a management gather buffer 142, a PCIe interface 144 connected to PCIe switch 108, and an I3C interface 146 connected to multiplexor 152. Management gather buffers 112, 122, 132, and 142 will be described below.

Management system 104 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide a management environment for information handling system 100. Management system 104 includes a BMC 150 and an I3C multiplexor 152, and is connected to various components of host processing system 102 via various internal communication interfaces, represented here as an interface 154, to provide an out-of-band (OB) mechanism to retrieve information related to the operation of the host environment, to provide BIOS/UEFI or system firmware updates, to manage non-processing components of information handling system 100, such as system cooling fans and power supplies. For example, interface 154 may include a Low Pin Count (LPC) interface, an Inter-Integrated-Circuit (I2C) interface, an I3C interface, a PCIe interface, or the like. An example of BMC 150 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as an Integrated Dell Remote Access Controller (iDRAC), an Embedded Controller (EC), or the like. Management system 104 may include additional memory devices, logic devices, security devices, or the like, as needed or desired.

In a traditional information handling system, a management system operates to manage the GPUs via the I3C interface between the BMC and each GPU. In particular, the BMC may need to manage power levels of the GPUs or other operational aspects of the GPU. Here, the BMC may operate to sequentially access each GPU in the information handling system to obtain operational information such as an operating temperature, a power level, a data bandwidth, or the like. Then, based upon the operational information, the BMC may operate to send control information back to each GPU to modify the operations of the GPUs. In this regard, a BMC may typically allocate a block of time, or polling window, to each GPU in the system, thereby ensuring that data traffic on the I3C bus is not mishandled due to the multi-master nature of the I3C bus architecture. An exemplary polling window may be set at 1.25-1.50 seconds per GPU.

It has been understood by the inventors of the present disclosure that, as the number of GPUs supported in an information handling system increases, the bandwidth of the I3C bus becomes a limiting factor to the timely management of critical operational aspects of the information handling system. For example, thermal, power, and telemetry algorithms implemented by a BMC may necessitate polling all GPUs in the information handling system much more frequently than would is provided by the polling window for the GPUs. For example, a particular thermal, power, and telemetry algorithm for an information handling system may dictate that power levels and temperatures of critical components of the information handling system be obtained and managed every five (5) seconds, in order to avoid damage to the critical components. Thus, where an information handling system includes four (4) GPUs, a 1.50 second polling window may be sufficient to implement the thermal, power, and telemetry algorithm. However, even reducing the polling window to 1.25 seconds only admits to the addition of one (1) more GPU. Moreover, as applications for GPUs in an information handling system become more popular, it is not uncommon to see 16 or more GPUs installed into an information handling system, and architectures are currently being proposed that include up to 64 GPUs. Here, even by reducing the polling window to 1.00 second, all of the necessary operational information and control information could not be communicated in less than a minute, a duration far to long for save and reliable operation.

One solution is to poll the GPUs via the host processing system. However, such a solution comes at the cost of increased management traffic on the host processing system interfaces, increased processor cycles dedicated to management functions, and an overall reduction in the performance of the information handling system on the other processing tasks.

Figure 2:
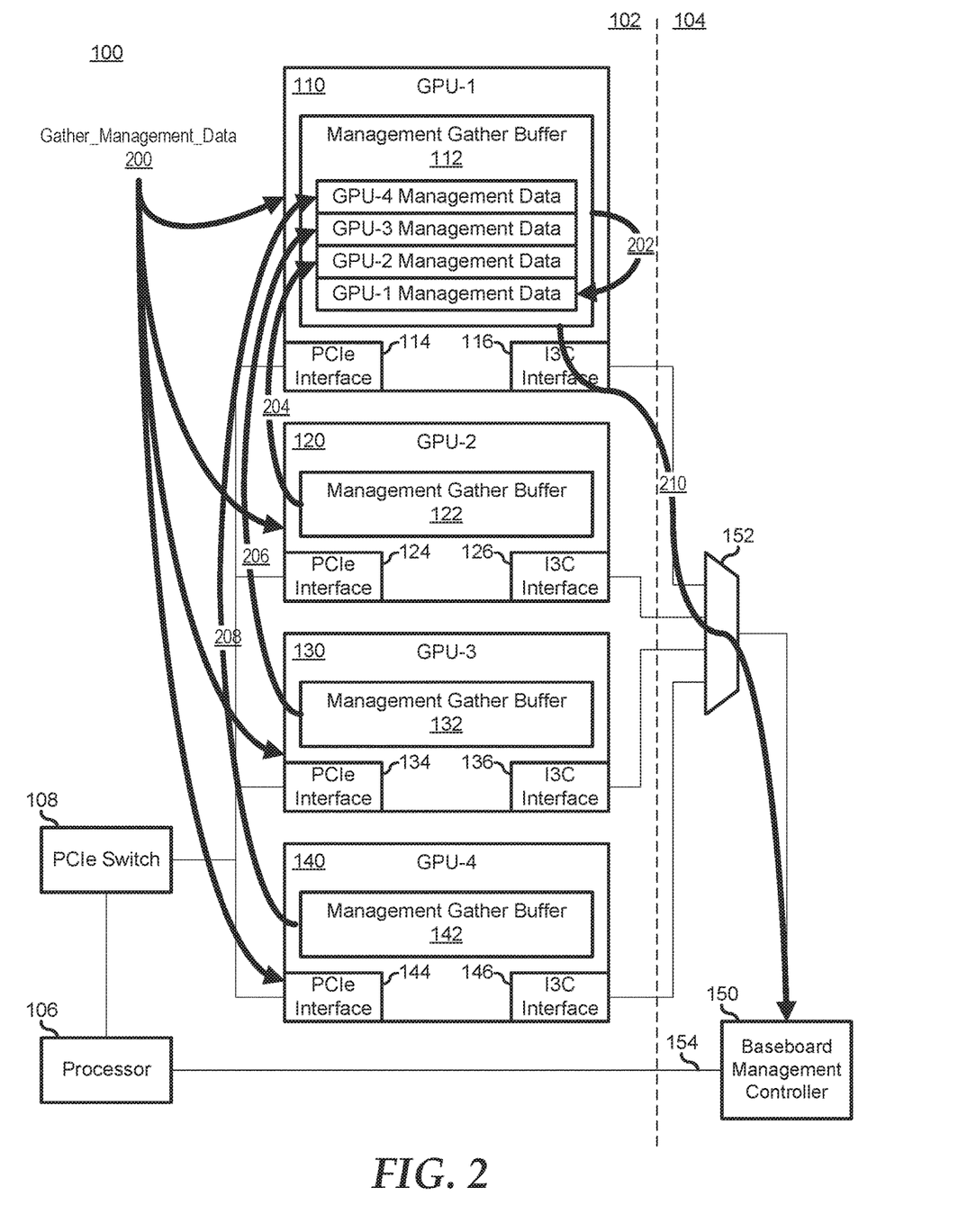
FIGS. 2 and 3 illustrate methods for graphics processing unit management infrastructure for real time data collection on the information handling system of FIG. 1.

FIG. 2 illustrates a method for managing GPUs 110, 120, 130, and 140. In a first step 200, a command (Gather_Management_Data) is given to all GPUs 110, 120, 130, and 140 to gather management information to management gather buffers 112, 122, 132, and 142. In a particular embodiment, the Gather_Management_Data command is periodically sent from BMC 150 to GPUs 110, 120, 130, and 140 via respective I3C interfaces 116, 126, 136, and 146. Here, separate Gather_Manangement_Data commands can be issued to each of GPUs 110, 120, 130, and 140 in a short window of time, or a Gather_Management_Data command can be broadcast to all of the GPUs simultaneously, such as by making a general call to an I3C address "0," whereby all GPUs receive the Gather_Management_Data command in a single I2C transaction. In another embodiment, the Gather_Management_Data command is sent from another element of information handling system 100, such as by a GPU driver that is executed on host processing system 102.

It will be seen that management gather buffer 112 includes locations that are associated with each of GPUs 110, 120, 130, and 140. It will be understood that management gather buffer 112 is typical of management gather buffers 122, 132, and 142, but that the details of management gather buffers 122, 132, and 142 are not shown in order to simplify the illustration. It will be further understood that management gather buffers 112, 122, 132, and 142 may be flexibly sized to accommodate a greater or a lesser number of GPUs. For example, where an information handling system includes 16 GPUs, each GPU may implement a management gather buffer sized to accommodate 16 sets of management information, one for each of the 16 GPUs.

In a next step 202, GPU 110 writes its management information into a location of management gather buffer 112 that is associated with GPU 110. Step 202 is illustrated as an internal transfer of management information within GPU 110. In subsequent steps 204, 206, and 208, GPUs 120, 130, and 140 respectively provide their management information to GPU 110 to be written into associated locations of management gather buffer 112. Here, the management information from GPU 120 is sent via PCIe interface 123, the management information from GPU 130 is sent via PCIe interface 134, and the management information from GPU 140 is sent via PCIe interface 144, and GPU 110 receives the management information from GPUs 120, 130, and 140 via PCIe interface 114. As such, it will be understood that the management information is routed through PCIe switch 108 as needed. In a particular embodiment, the Gather_Management_Data command includes a field that identifies the target GPU to which to gather the management information. For example, the Gather_Management_Data command illustrated in step 202 can include an identifier of GPU 110 as the target to which to send the management information. Here, in response, the management information from GPUs 110, 120, 130, and 140 is gathered into only management gather buffer 110. In this embodiment, BMC 150 can determine that a particular one of GPUs 110, 120, 130, and 140 is more lightly loaded, and can select that particular GPU as the target to which to send the management information. In another embodiment, the Gather_Management_Data command is a generally applicable command that triggers a sharing of all management information from all of GPUs 110, 120, 130, and 140 to all of management gather buffers 112, 122, 132, and 142, such that all of the management gather buffers include identical copies of the management information from all of the GPUs.

In a final step 210, BMC 150 retrieves the management information from management gather buffer 112 via the I3C interface. It will be noted that in this method, the need for long polling windows is reduced, in that BMC 150 only needs to spend a short duration of time to send the Gather_Management_Data command (e.g., one transaction for a broadcast command or four (4) transactions for individual commands), followed by another short duration of time to receive the management information from management gather buffer 112.

Having received the management information from GPUs 110, 120, 130, and 140 via management gather buffer 112, BMC 150 can then take timely action to manage the operations of the GPUs as needed. For example, if only a relatively small number of GPUs need to have their operational settings updated, such as when one or more GPUs is operating in an over-temperature condition, BMC 150 can directly access the particular GPUs via their I3C interfaces to manage their operational settings. On the other hand, if a large number GPUs need to have their operational setting updated, such as when a system-wide power- or temperature-shedding event occurs, BMC 150 can quickly write the management information for all of the GPUs to the management gather buffer of one of the GPUs, and that GPU can forward the management information for each other GPU to that GPU via the PCIe interface, thereby greatly accelerating the time needed to manage a large number of GPUs.

In a particular embodiment, the method depicted in FIG. 2 can be performed without a specific issuance of a Gather_Management_Data command. Here, GPUS 110, 120, 130, and 140 can be configured to periodically share their management information with the other GPUs without having received a Gather_Management_Data command. In this way, BMC 150 only needs to retrieve the management information form one of management gather buffers 112, 122, 132, or 142 as needed.

Figure 3:
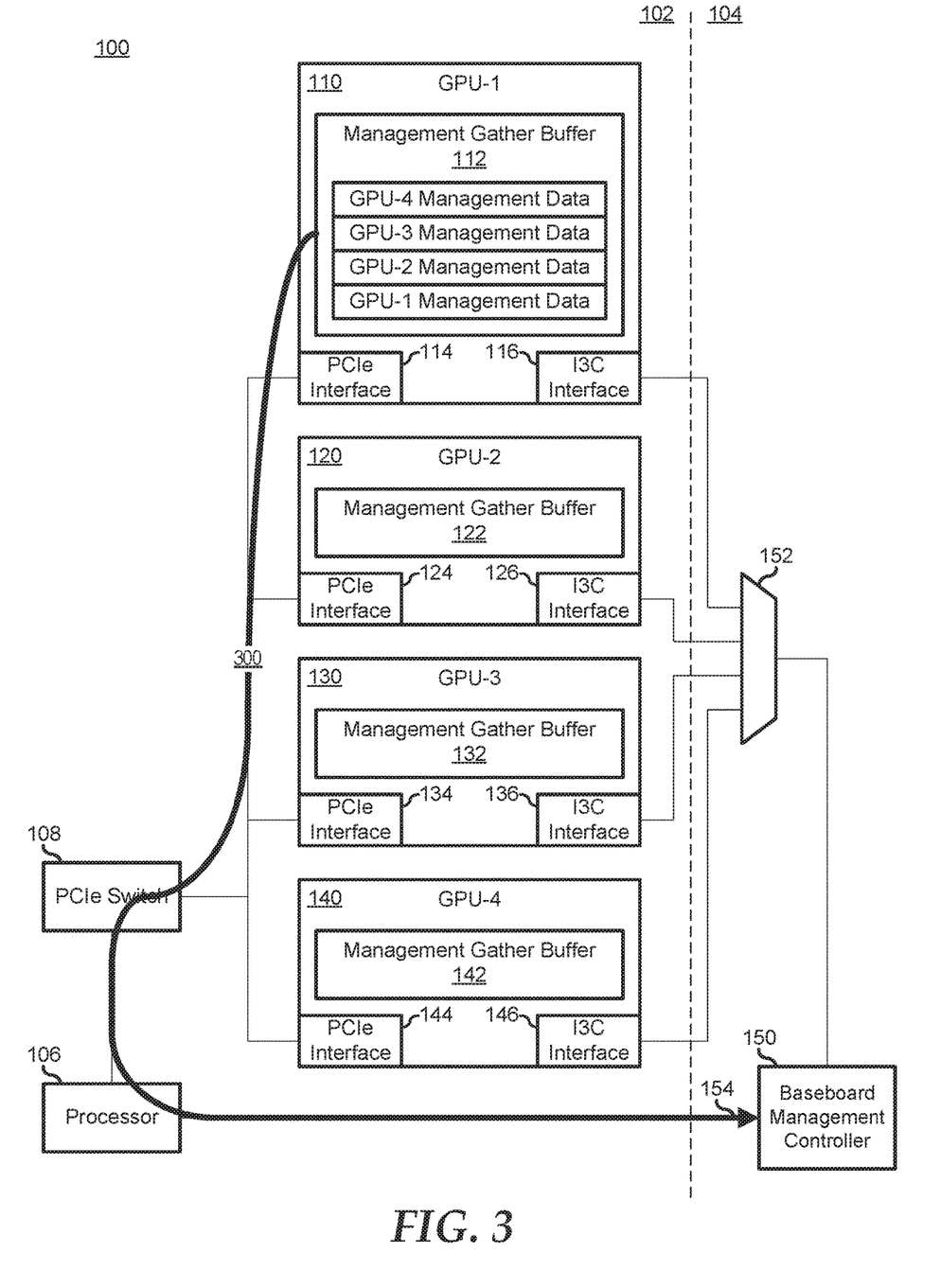

FIG. 3 illustrates an alternate method for managing GPUs 110, 120, 130, and 140. Here, it is understood that management information from GPUs 110, 120, 130, and 140 have been gathered into one or more of management gather buffers 112, 122, 132, and 142, as described with respect to FIG. 2. Then, when BMC 150 needs to retrieve the management information from management gather buffer 112, the BMC does so via interface 154 to processor 106, to PCIe switch 108, and via PCIe interface 114, as shown in step 300. Here, it will be understood that retrieving the management data through host processing system 102 utilizes resources of the host processing system. However, where the number of GPUs in information handling system 100 is large, the higher bandwidth typically available via host processing system 102 may offset the amount of time needed to retrieve the management information via the typically slower I3C bus. It will further be understood that, where BMC 150 needs to control a large number of GPUs, such as when a system-wide power- or temperature-shedding event occurs, BMC 150 can quickly write the management information for all of the GPUs to the management gather buffer of one of the GPUs via host processing system 104, and that GPU can forward the management information for each other GPU to that GPU via the PCIe interface, thereby greatly accelerating the time needed to manage a large number of GPUs.

Figure 4:
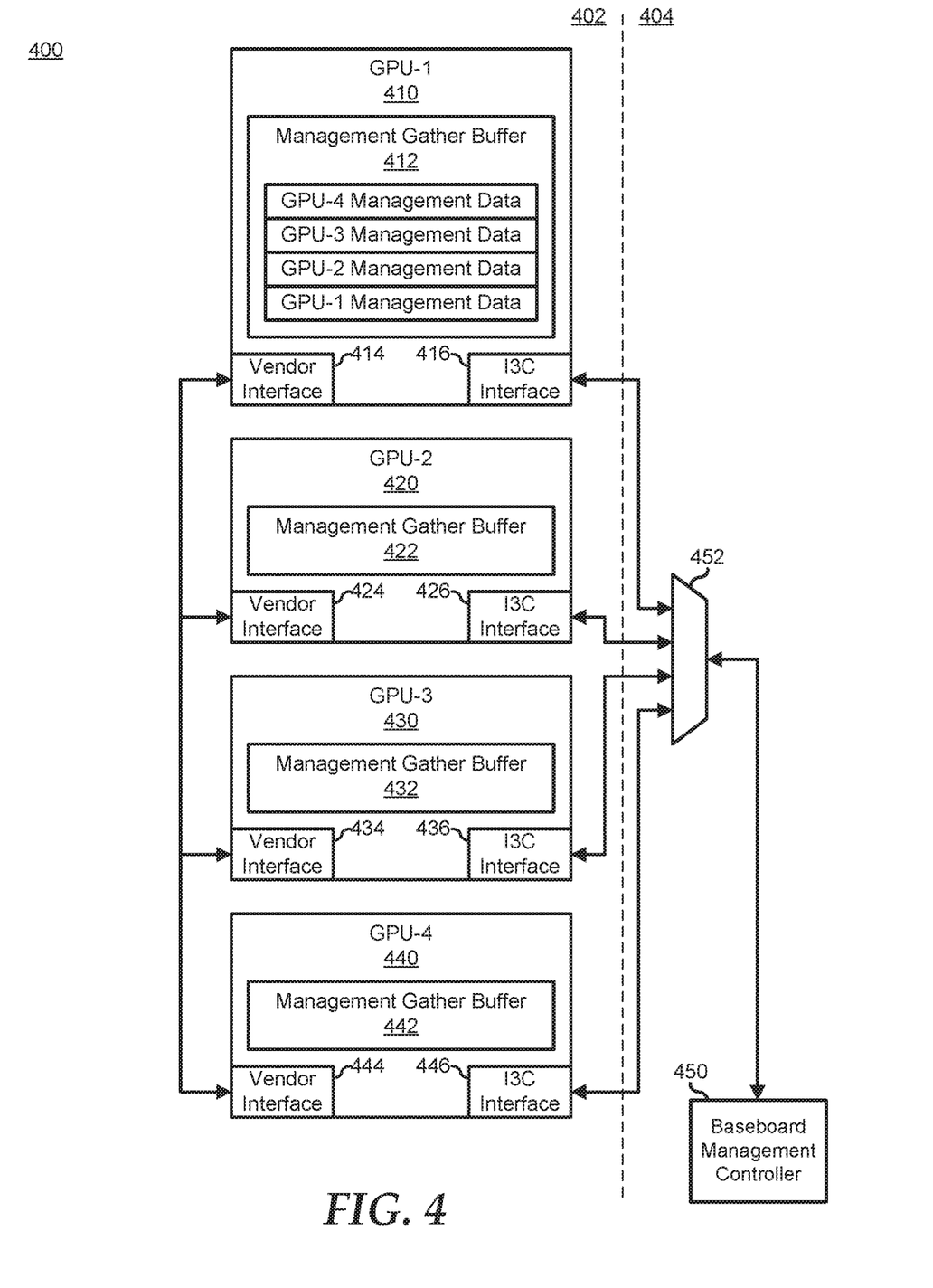
FIG. 4 is a block diagram illustrating an information handling system according to another embodiment of the present disclosure.

FIG. 4 illustrates an information handling system 400 similar to information handling system 100, including a host processing system 402 and a management system 404. Host processing system 402 represents hardware, firmware, and software components that are typically associated with a computer or other information handing system, and will be understood to include a processor and a PCIe switch (not illustrated), and GPUs 410, 420, 430, and 440. GPU 410 includes a management gather buffer 412, a vendor interface 414, and an I3C interface 416 connected to multiplexor 452. GPU 420 includes a management gather buffer 422, a vendor interface 424, and an I3C interface 426 connected to multiplexor 452. GPU 430 includes a management gather buffer 432, a vendor interface 434, and an I3C interface 436 connected to multiplexor 452. GPU 440 includes a management gather buffer 442, a vendor interface 444, and an I3C interface 446 connected to multiplexor 452. Here, in addition to being connected via PCIe interfaces to the PCIe switch, as shown and described with respect to information handling system 100, GPUs 410, 420, 430, and 440 are connected together via a vendor specific interface. As such, vendor interfaces 414, 424, 434, and 444 each represent one or more point-to-point high-speed data communication interfaces that are provided in accordance with a particular vendor's own internal specification, and that are used to provide dedicated data communications between the GPUs. An example of a vendor specific interface includes a communication interface in accordance with an NVLink protocol developed by Nvidia, or another vendor specific interface, as needed or desired. In a typical topology, a particular GPU may include six (6) separate vendor specific interface links that can be configured in various clustering topologies, as needed or desired. As such, information handling system 400 is illustrative, and is not meant to provide details as to any particular topology, and the details of providing clustered topologies is known in the art and will not be further disclosed herein except as needed to describe the present embodiments.

Management system 404 is similar to management system 104, and includes a BMC 450 and an I3C multiplexor 452. An example of BMC 450 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as an Integrated Dell Remote Access Controller (iDRAC), an Embedded Controller (EC), or the like. Management system 404 may include additional memory devices, logic devices, security devices, or the like, as needed or desired.

Figure 5:
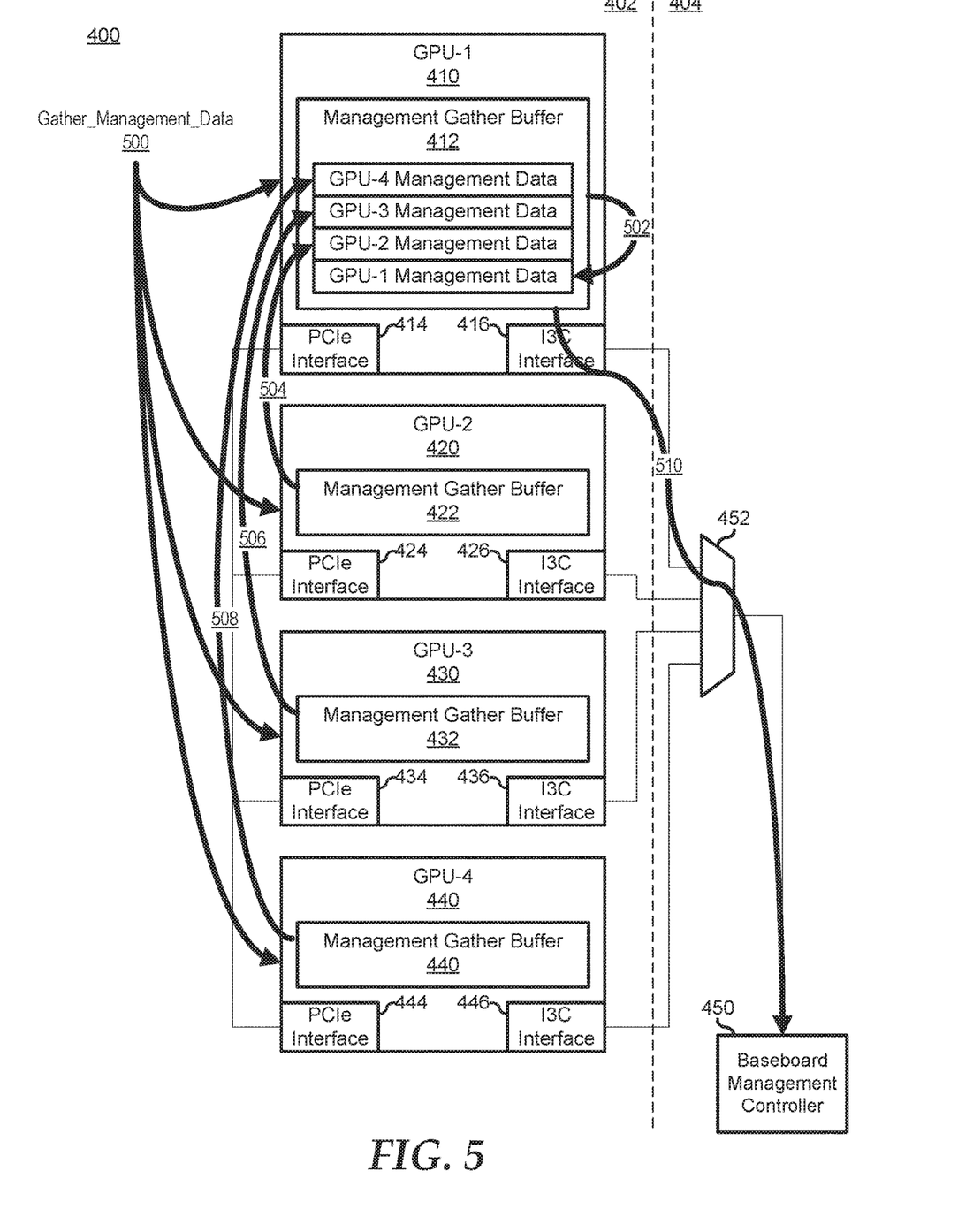
FIG. 5 illustrates a method for graphics processing unit management infrastructure for real time data collection on the information handling system of FIG. 4.

FIG. 5 illustrates a method for managing GPUs 410, 420, 430, and 440. In a first step 500, a command (Gather_Management_Data) is given to all GPUs 410, 420, 430, and 440 to gather management information to management gather buffers 412, 422, 432, and 442. The Gather_Management_Data command can be provided in accordance with any of the embodiments described above with respect to FIG. 2. Moreover, management gather buffers 412, 422, 432, and 442 are similar to the management gather buffers as described above with respect to FIG. 2. Thus, in a next step 502, GPU 410 writes its management information into a location of management gather buffer 412 that is associated with GPU 410, and in subsequent steps 504, 506, and 508, GPUs 420, 430, and 440 provide, via respective vendor interfaces 424, 434, and 444, their management information to GPU 410, via vendor interface 414, to be written into associated locations of management gather buffer 412.

In a final step 510, BMC 450 retrieves the management information from management gather buffer 412 via the I3C interface. It will be noted that in this method, the need for long polling windows is reduced, in that BMC 450 only needs to spend a short duration of time to send the Gather_Management_Data command (e.g., one transaction for a broadcast command or four (4) transactions for individual commands), followed by another short duration of time to receive the management information from management gather buffer 412.

Having received the management information from GPUs 410, 420, 430, and 440 via management gather buffer 412, BMC 450 can then take timely action to manage the operations of the GPUs as needed. For example, if only a relatively small number of GPUs need to have their operational settings updated, such as when one or more GPUs is operating in an over-temperature condition, BMC 450 can directly access the particular GPUs via their I3C interfaces to manage their operational settings. On the other hand, if a large number GPUs need to have their operational setting updated, such as when a system-wide power- or temperature-shedding event occurs, BMC 450 can quickly write the management information for all of the GPUs to the management gather buffer of one of the GPUs, and that GPU can forward the management information for each other GPU to that GPU via the vendor interface, thereby greatly accelerating the time needed to manage a large number of GPUs.

Figure 6:
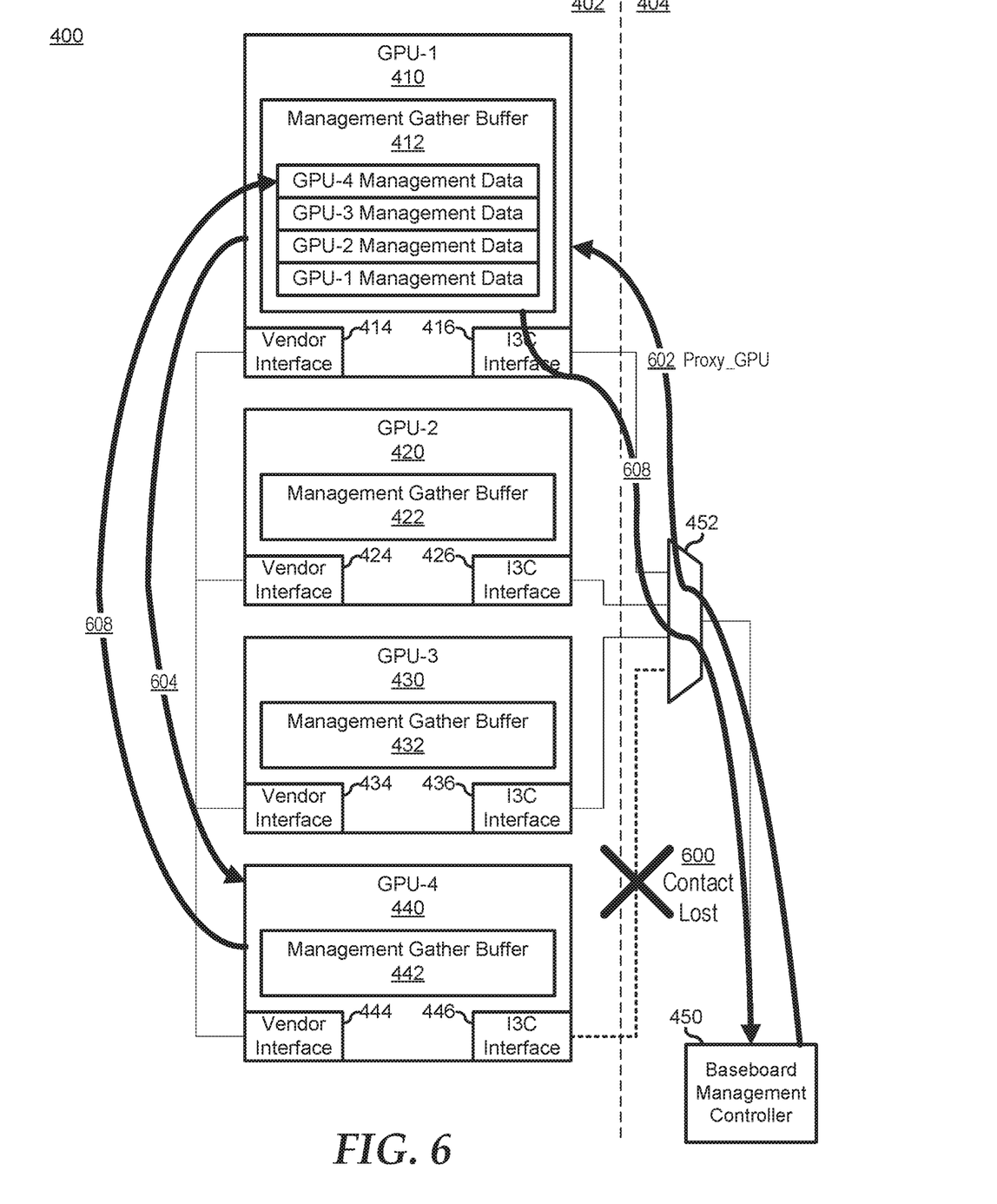
FIG. 6 illustrates a method for proxying GPU management information on the information handling system of FIG. 4.

FIG. 6 illustrates a method for proxying GPU management information on the information handling system of FIG. 4. At a step 600, BMC 450 detects a loss of communication with GPU 440 via I3C interface 426. Here, prior to the detection of the loss of communication, BMC 450 operates to map GPUs 410, 420, 430, and 440 to their respective PCIe slots. That is, BMC 450 determines the Bus/Device/Function mappings for each of GPUs 410, 420, 430, and 440. Ina particular embodiment, the mapping is based upon a BIOS/UEFI inventory table of PCIe devices in information handling system 100. Here, BMC 450 can query the BIOS through a Management Component Transport Protocol (MCTP) discovery. When BMC 450 detects the loss of communication with GPU 440, then in a step 602 the BMC sends a command (Proxy_GPU) to another GPU, here illustrated as GPU 410, to act as a proxy between the BMC and GPU 440. Here, the Proxy_GPU command can include the bus/device/function mapping of GPU 440. Then, in a step 604, based upon the bus/device/function mapping of GPU 420, GPU 410 sends a request to GPU 440 via vendor interface 414 to retrieve management information from GPU 440, and, in a step 606, GPU 440 sends the management information to GPU 410 via vendor interface 444. Finally, in a step 608, GPU 410 forwards the management information from GPU 440 to BMC 450 via I3C interface 416. In this way, BMC 450 can maintain communications with GPU 440, even with a failed I3C connection. Further, using GPU 410 as the proxy between GPU 440 and BMC 450, the BMC can communicate management information back to GPU 440 to manage the power level, the temperature level, or the like.

Figure 7:
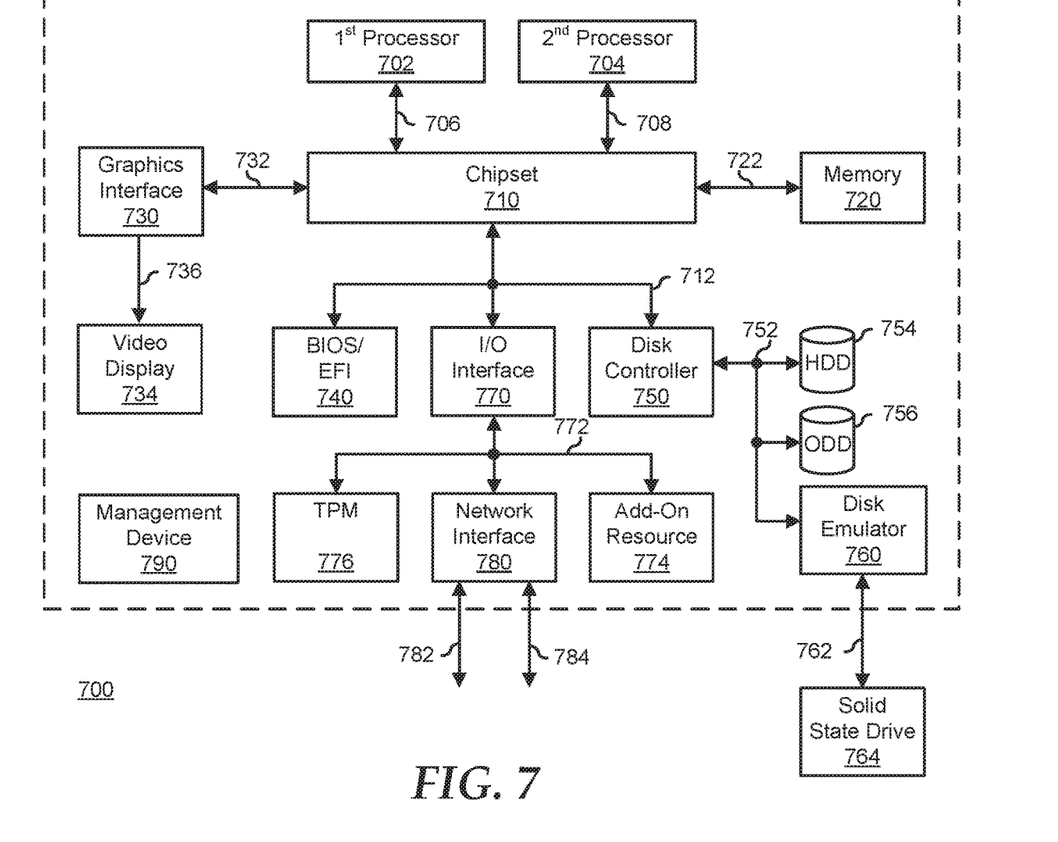
FIG. 7 is a block diagram illustrating an information handling system according to another embodiment of the present disclosure.

FIG. 7 illustrates a generalized embodiment of an information handling system 700 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, a chipset 710, a memory 720, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an input/output (I/O) interface 770, one or more add-on resources 774, a trusted platform module (TPM) 776, a network interface 780, a management device 790, and a power supply 795. Processors 702 and 704, chipset 710, memory 720, graphics interface 730, BIOS/UEFI module 740, disk controller 750, HDD 754, ODD 756, disk emulator 760, SSD 762, I/O interface 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via a separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to add-on resource 774, to TPM 776, and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 may include a commercially available BMC product that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as a Integrated Dell Remote Access Controller (iDRAC), or the like. Management device 790 may further include associated memory devices, logic devices, security devices, or the like, as needed or desired.

Power supply 795 represents one or more devices for power distribution to the components of information handling system 700. In particular, power supply 795 can include a main power supply that receives power from an input power source, such as a wall power outlet, a power strip, a battery, or another power source, as needed or desired. Here, power source 795 operates to convert the power at a first voltage level from the input power source to one or more power rails that are utilized by the components of information handling system. Power supply 795 can also include one or more voltage regulators (VRs) that each receive power from the main power supply and that operate to convert the input voltage to an output voltage that is used by one or more components of information handling system. For example, a VR can be provided for each of processors 702 and 704, and another VR can be provided for memory 720. Power supply 795 can be configured to provide a first power plane that provides power to the host environment, and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first graphics processing unit (GPU) including a first high-speed interface;
   a second GPU including a second high-speed interface coupled to the first high-speed interface; and
   a baseboard management controller (BMC);
   wherein:
      the first GPU is configured to receive a command to provide management data to the BMC, and to provide first management data associated with the first GPU to the second GPU via the first high-speed interface in response to receiving the command; and
      the second GPU is configured to receive the command, to receive the first management data via the second high-speed interface in response to receiving the command, and to provide the first management data and second management data associated with the second GPU to the BMC in further response to the command.

2. The information handling system of claim 1, wherein the first GPU includes a first management data buffer and the second GPU includes a second management data buffer.

3. The information handling system of claim 2, wherein the second GPU is further configured to store the first management data in a first location of the second management data buffer and to store the second management data in a second location of the second management data buffer.

4. The information handling system of claim 3, wherein in further response to the command, the second GPU is configured to provide the second management data to the first GPU via the second high-speed interface.

5. The information handling system of claim 4, wherein the first GPU is further configured to store the first management data in a first location of the first management data buffer and to store the second management data in a second location of the first management data buffer.

6. The information handling system of claim 1, wherein the BMC includes a third high-speed interface coupled to the second high-speed interface.

7. The information handling system of claim 6, wherein the BMC is configured to receive the first management data and the second management data via the third high-speed interface.

8. The information handling system of claim 1, wherein the BMC includes a first low-speed interface and the second GPU includes a second low-speed interface coupled to the first low-speed interface.

9. The information handling system of claim 8, wherein the BMC is configured to receive the first management data and the second management data via the first low-speed interface.

10. The information handling system of claim 9, wherein the first GPU includes a third low-speed interface coupled to the first low-speed interface, the first GPU receives the command via the third low-speed interface, and the second GPU receives the command via the second low-speed interface.

11. A method, comprising:
    receiving, by a first graphics processing unit (GPU) via a first high-speed interface of the first GPU coupled to a second high-speed interface of a second GPU, a command to provide management data to a baseboard management controller (BMC);
    providing, by the first GPU, first management data associated with the first GPU to the second GPU via the first high-speed interface in response to the command;
    receiving, by the second GPU, the command;
    receiving, by the second GPU, the first management data via the second high-speed interface in response to the command; and
    providing, by the second GPU, the first management data and second management data associated with the second GPU to the BMC in further response to the command.

12. The method of claim 11, wherein the first GPU includes a first management data buffer and the second GPU includes a second management data buffer.

13. The method of claim 12, further comprising:
    storing, by the second GPU, the first management data in a first location of the second management data buffer; and
    storing, by the second GPU, the second management data in a second location of the second management data buffer.

14. The method of claim 13, further comprising:
providing, by the second GPU, the second management data to the first GPU via the second high-speed interface in further response to the command.

15. The method of claim 14, further comprising:
storing, by the first GPU, the first management data in a first location of the first management data buffer; and
storing, by the first GPU, the second management data in a second location of the first management data buffer.

16. The method of claim 11, wherein the BMC includes a third high-speed interface coupled to the second high-speed interface.

17. The method of claim 16, further comprising:
receiving, by the BMC, the first management data and the second management data via the third high-speed interface.

18. The method of claim 11, wherein the BMC includes a first low-speed interface, the second GPU includes a second low-speed interface coupled to the first low-speed interface, and the first GPU includes a third low-speed interface.

19. The method of claim 18, further comprising:
receiving, by the first GPU, the command via the third low-speed interface;
receiving, by the second GPU, the command via the second low-speed interface; and
receiving, by the BMC, the first management data and the second management data via the first low-speed interface.

20. An information handling system, comprising:
a first graphics processing unit (GPU) including a first low-speed interface and a first high-speed interface;
a second GPU including a second low-speed interface and a second high-speed interface coupled to the first high-speed interface; and
a baseboard management controller (BMC) including a third low-speed interface coupled to the first and second low-speed interfaces, the BMC configured to:
determine that the BMC cannot communicate with the first GPU via the first low-speed interface; and
provide a command to the second GPU to retrieve management data from the first GPU;
wherein the second GPU is configured to:
request the management data from the first GPU via the second high-speed interface in response to the command;
receive the management data from the first GPU via the second high-speed interface; and
provide the management data to the BMC via the second low-speed interface.

* * * * *